United States Patent [19]
Derbyshire

[11] 3,811,693
[45] May 21, 1974

[54] DRILL CHUCK
[75] Inventor: George C. Derbyshire, Sheffield, England
[73] Assignee: The Jacobs Manufacturing Company, Limited, Sheffield, England
[22] Filed: Mar. 30, 1973
[21] Appl. No.: 346,420

[30] Foreign Application Priority Data
May 15, 1972 Great Britain.................... 22698/72

[52] U.S. Cl..................... 279/18, 279/1 L, 279/83
[51] Int. Cl............................................ B23b 31/04
[58] Field of Search................. 279/18, 1 L, 83, 85; 408/240; 10/141 H

[56] References Cited
UNITED STATES PATENTS
820,263   5/1906   Schmid et al......................... 279/18

Primary Examiner—Francis S. Husar
Attorney, Agent, or Firm—Stephen J. Rudy

[57] ABSTRACT

A drill chuck having a sleeve for reception of a drill shank through a central hole in its front end into a body part in the sleeve, the body part carrying mutually slidable gripping members provided with apertures into which the shank is received and retained by means of adjustable screws in the slidable member. The sleeve is internally formed to carry a disc that bears against an outermost one of the gripping members, and the body is adapted for reception of a tanged end of a drill inserted into the chuck.

10 Claims, 5 Drawing Figures

PATENTED MAY 21 1974 3,811,693

3,811,693

DRILL CHUCK

BACKGROUND OF THE INVENTION

This application is directed to an improvement in drill chucks over that provided in my co-pending application Ser. No. 201,090, filed Nov. 22, 1971 and now U.S. Pat. No. 3,751,052.

According to the present invention, there is provided a drill chuck including a body part having a pair of mutually perpendicular slots opening from a front end thereof, a pair of gripping members slidably mounted in said slots, each gripping member comprising an apertured member capable of receiving a drill shank in its aperture and a screw for retaining the drill shank in said aperture, and a sleeve surrounding said body part and provided with radial holes to permit adjustment of the screws in the apertured members, said sleeve being in the form of a light metal pressing and incorporating or carrying a disc element arranged to overlie the front end of the body part and to abut against an outermost one of the gripping members. The disc element will preferably be a separate piece, conveniently a further light metal pressing, cooperating with an inturned portion of the sleeve, preferably a portion of said sleeve which has been inturned to form an internal flange extending concentrically within the generally cylindrical shape of the sleeve. The sleeve will preferably be a tight push fit or a snap fit on the body part and will preferably have a leading end, that is to say, an end which is pressed onto the body part, which has a completely inturned edge so that it has substantial strength despite the fact that it is made from relatively light gauge metal plate. The sleeve will also preferably be formed with a series of longitudinally extending flutes to further strengthen its light gauge wall. The arrangement may be such that the radial holes in the sleeve are automatically brought into alignment with the screws in the apertured gripping members when the sleeve is positioned on the body part, conveniently by means of said sleeve being provided with a dimple arranged to engage a groove in the body part. However, the size of the radial holes may be such that although a suitable key can be inserted through said holes for the adjustment of the screws, said holes are not sufficiently large to allow the passage of said screws. The body part may be provided with means for engaging a tanged end of a drill.

BRIEF DESCRIPTION OF THE DRAWING

In order that the invention may be fully understood and readily carried into effect, the same will now be described, by way of example only, with reference to the accompanying drawings, of which.

DESCRIPTION OF PREFERRED EMBODIMENTS

Figure 1:
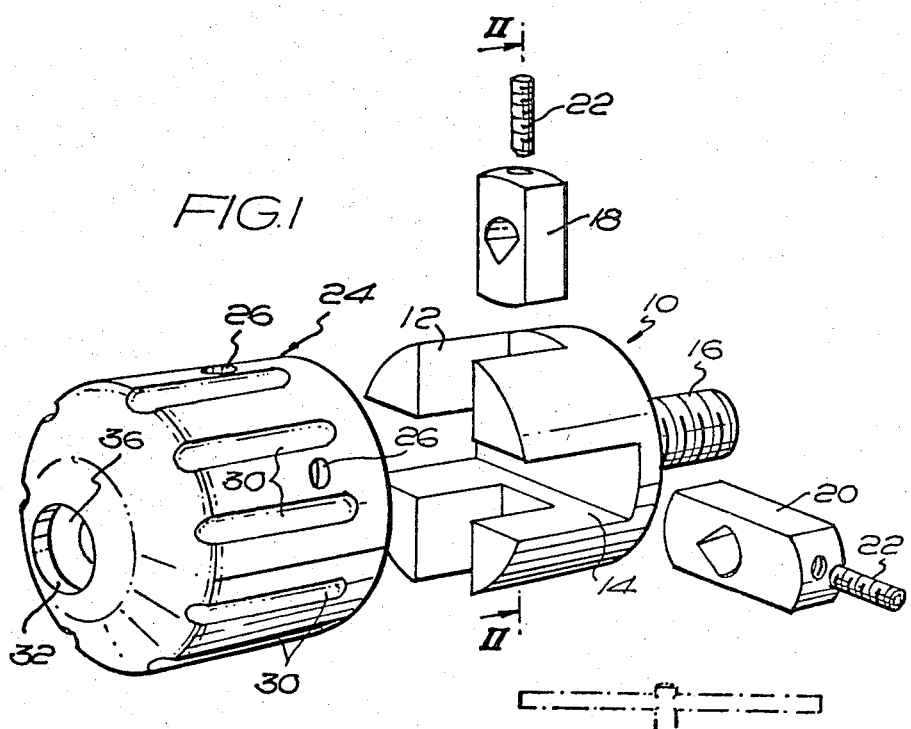
FIG. 1 is a perspective exploded view of a drill chuck embodying the invention.

Referring now to FIGS. 1 to 4 of the drawings, the drill chuck there illustrated includes a body part, generally indicated 10, having a pair of mutually perpendicular slots 12 and 14 opening from a front end thereof and a screw threaded spigot 16 extending from a rear end for connection to a power tool. The slot 12 is somewhat shallower than the slot 14.

Figure 3:
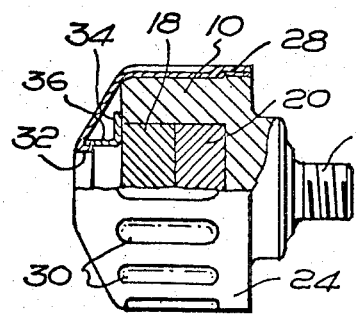
FIG. 3 is a side view partly in section.
Figure 3:
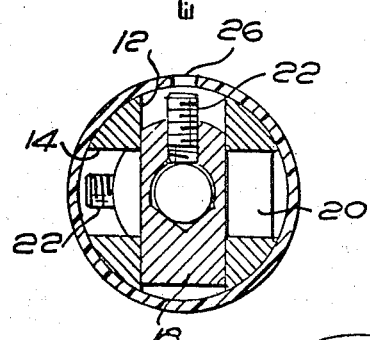

A pair of gripping members 18 and 20 are slidably mounted in the slots 12 and 14, the arrangement being such that the gripping member 18 overlies the gripping member 20 as best shown in FIG. 3. Each gripping member comprises an apertured metal block capable of receiving a drill shank in its aperture, which is partly of V-form, and a grub screw 22 for retaining the drill shank in said aperture. The arrangement is such that whatever size of drill is mounted in the chuck, within the capacity of the chuck that is, the drill assumes a position at the axis of the body part by virtue of the mutually perpendicular arrangement of the gripping members.

A sleeve 24 in the form of a light metal pressing surrounds the body part and hides the gripping members from view. It is provided with a pair of radial holes 26 through which a suitable key can be inserted for the adjustment of the screw 22 as shown in chain-dotted lines in FIG. 2. However, said holes are not sufficiently large to allow the passage of said screws and there is thus no danger of the screws working loose during service to such an extent that they can project from the sleeve (which would, of course, constitute a danger to an operative grasping the chuck before it had quite stopped).

Figure 4:
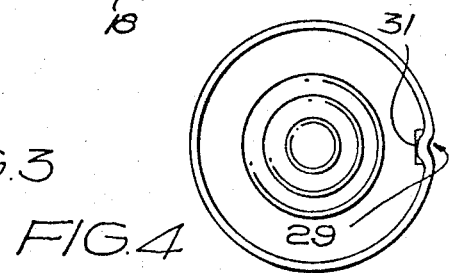
FIG. 4 is a view in the direction of arrow 4 in FIG. 3.

The sleeve 24 has been formed at a leading end, that is to say, at an end which is passed over the body part on assembly of the chuck, with a completely inturned edge 28 which gives it substantial strength despite the fact that it is made from relatively light gauge metal plate. The doubled edge portion of the sleeve is a tight press fit on the body part. The sleeve is also formed with a series of longitudinally extending flutes 30 which further strengthen its light gauge wall. As shown in FIG. 4, a dimple 29 has been formed in the inturned edge 28 and this engages a groove 31 in the body part to ensure that the sleeve is mounted on said body part in such a way that the radial holes 26 are automatically aligned with the screws 22.

At its end remote from the inturned edge 28, the sleeve has a dished formation as shown and is provided with an integral flange 32 extending concentrically within the generally cylindrical shape of the sleeve. Said flange forms an inturned portion of the sleeve with which a disc element 34 cooperates and overlies the front end of the body part to abut against the outermost gripping member 18 and retain it in its slot in sliding engagement with the gripping member 20. The disc element has been formed as a further light metal pressing with an integral flange portion 36 which is a push fit on the flange 32 of the sleeve.

Thus, there is provided a drill chuck which can be produced very cheaply and yet is very safe and convenient to use.

Figure 5:
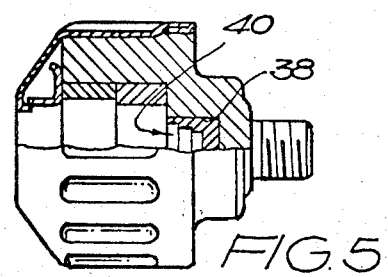
FIG. 5 is a view similar to FIG. 3 which will presently be referred to when describing possible modifications.
Figure 2:
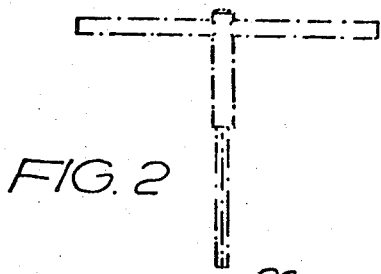
FIG. 2 is a cross section on the line II—II in FIG. 1.

Referring now to FIG. 5, in a modification of the chuck just described the body part 10 has been provided with an insert 38 having a stepped aperture 40, that is to say, an aperture with three sections of gradually decreasing rectangular size for the reception of tanged drill ends. Such a modification is advantageous in assisting the gripping members to drive the drill and to resist sudden snatch torque when drilling for example through sheet metal.

Various other modifications may be made without departing from the scope of the invention. For example, the chuck may be provided with other mounting means, that is to say, it need not necessarily be provided with a screwthreaded spigot portion for connection to a power tool; it could be provided with a "Morse taper" spindle or a power tool spindle, (i.e., a straight shank), for example.

The disc element which overlies the front end of the body part and abuts against the outermost one of the gripping members need not necessarily be a further light metal pressing; it could, for example, be a synthetic plastics moulding. On the other hand, it may even be formed integrally with the sleeve. The sleeve could be arranged to be a snap fit on the body part.

What is claimed is:

1. A drill chuck including a body part having a pair of mutually perpendicular slots opening from a front end thereof, a pair of gripping members slidably mounted in said slots, each gripping member comprising an apertured member capable of receiving a drill shank in its aperture and a screw for retaining the drill shank in said aperture, a sleeve surrounding said body part and provided with radial holes to permit adjustment of the screws in the apertured members, and means for retaining the sleeve on the body part, wherein the body is provided with internal means for engaging a tanged end of a drill caused to be inserted in the chuck.

2. A drill chuck including a body part having a pair of mutually perpendicular slots opening from a front end thereof, a pair of gripping members slidably mounted in said slots, each gripping member comprising an apertured member capable of receiving a drill shank in its aperture and a screw for retaining the drill shank in said aperture, a sleeve surrounding said body part and provided with radial holes to permit adjustment of the screws in the apertured members, and means for retaining the sleeve on the body part, wherein the sleeve is in the form of a light metal pressing incorporating a disc element arranged to overlie a front end of the body part and to abut against an outermost one of the gripping members.

3. A drill chuck as in claim 2, wherein the sleeve has an inturned portion about an axial opening at its front end defining an internal flange concentrically within the cylindrical shape of the sleeve, and the disc is a separate light metal pressing engaging the flange.

4. A drill chuck as in claim 2, wherein the sleeve has a pressed holding fit with the body.

5. A drill chuck as in claim 4, wherein the sleeve has a rear leading end turned inwardly upon itself in pressed engagement with the body.

6. A drill chuck as in claim 2, wherein the sleeve has a snap holding fit with the body.

7. A drill chuck as in claim 2, wherein the sleeve is formed with a series of longitudinally extending flutes providing strength to the sleeve.

8. A drill chuck as in claim 2, wherein the sleeve is provided with a dimple engaged in a groove of the body whereby the radial holes in the sleeve are maintained in alignment with the screws.

9. A drill chuck as in claim 2, wherein the body is provided with means for engaging a tanged end of a drill caused to be inserted in the chuck.

10. A drill chuck including a body part having two pairs of prongs extending longitudinally from a front end thereof and defining a pair of mutually perpendicular diametrical channels, a pair of gripping members slidably mounted in said channels, each gripping member comprising an apertured member capable of receiving a drill shank in its aperture and a screw for retaining the drill shank in said aperture, a sleeve surrounding said body part provided with radial holes to permit adjustment of the screws in the apertured members, and means for retaining the sleeve on the body, wherein the sleeve is in the form of a light metal pressing incorporating a disc element arranged to abut against an outermost one of the gripping members.

* * * * *